April 6, 1954
O. H. VARGA ET AL
2,674,477
SWINGING ARM
Filed Jan. 23, 1951
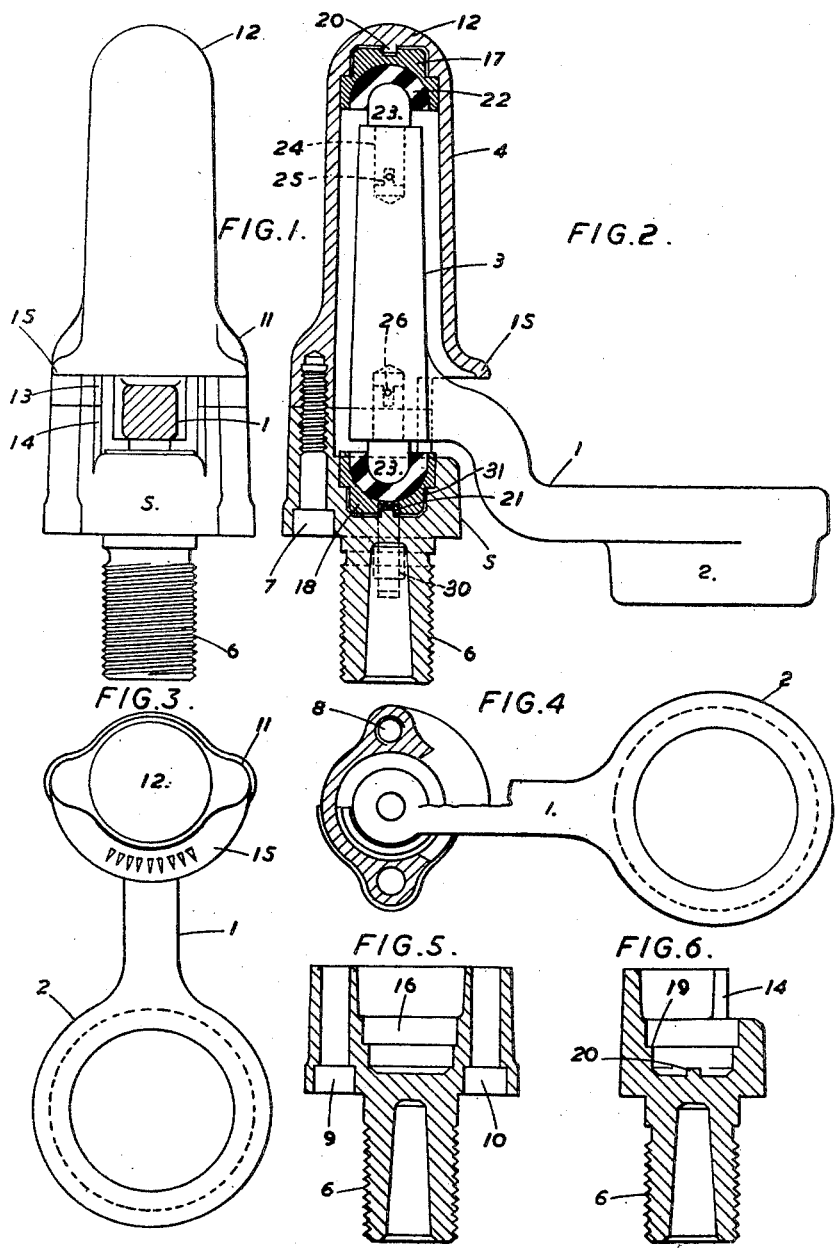
Inventors
OTTO H. VARGA
ALEXANDER E. MOULTON and
LEONARD TAYLOR
By
Shoemaker & Mattern
Attorneys Patented Apr. 6, 1954

2,674,477

UNITED STATES PATENT OFFICE 2,674,477

SWINGING ARM

Otto Herman Varga and Alexander Eric Moulton, Bradford-on-Avon, and Leonard Taylor, Portishead, England, assignors to Seetru Products Limited, Bristol, England, a body corporate of Great Britain Application January 23, 1951, Serial No. 207,329

8 Claims. (Cl. 287—85)

This invention relates to swinging arms for the spindles of spinning machines and the like.

In spinning machines and similar apparatus it is customary for the spindles which rotate at high speed to be driven by contact with a flat belt, maintenance of contact with the belt being usually effected by mounting the spindles on a swinging arm or jockey which is urged by a steel spring about a lubricated bearing to effect contact between the spindles and the belt under the desired pressure.

The present invention has among its objects to provide an improved arrangement of swinging arm with which lubrication is unnecessary and with which wear and resultant noise is substantially eliminated. Further and favourable objects will appear from the following description.

In a swinging arm mounting for the spindles of spinning machines and the like according to the present invention, the functions of a bearing and a spring are jointly fulfilled by a rubber mounting adapted to apply the appropriate torque to the arm and to eliminate the necessity for lubrication.

In a specific embodiment of swinging arm mounting according to the invention, at each end of the swinging axis of the arm, cup shaped or part spherical bodies of rubber are provided to mount the arm, the arrangement being such that when the arm is swung from a neutral position, the rubber of the cups is stressed or deformed and tends to return the arm to such neutral position.

Advantageously in the case of part spherical rubber cups, the rubber bonded to the two mating metal surfaces forms separate units. Thus, the outer surface of the rubber is bonded to the part spherical surface of a metal thimble, which is contained in the mounting structure for the spindle, and the inner surface of the rubber is bonded to ball ended metal pins, which are a tight push fit in aligned sockets provided for the purpose in the swinging arm on its axis.

The mounting structure for the spindle consists conveniently of a thick walled metal tube or housing in two parts, the upper part being a domed cap and the bottom part of which is also closed and carries a threaded shank. This threaded shank fits into a corresponding socket on the spinning machine. The metal tube has an axially extending arcuate opening between the two parts, through which opening the swinging arm protrudes. The top part of the metal tube takes the upper thimble and compresses the rubber cups on the top and bottom of the swinging arm axis to any desired extent. By varying the compression on these metal cups, say by spacing washers between the two parts of the tube, the axial, transverse and tilting stiffness of the mounting can be adjustably controlled.

The invention will be further described with reference to the accompanying explanatory drawings which illustrate this specific embodiment by way of example and in which Fig. 1 is a front view of the combined bearing and spring mounting with the swinging arm itself in section.

Fig. 2 is a vertical section showing the interior configuration of the two-part housing, while Fig. 3 is a plan view of the mounting and Fig. 4 is a cross sectional view.

Figs. 5 and 6 are detailed sectional views of the bottom housing, Fig. 5 showing the seat for the lower thimble with countersunk apertures one on each side taking the screws securing the top housing and Fig. 6 showing the front of the housing cut away to provide an opening through which the swinging arm protrudes.

Referring now to the drawings, 1 generally designates the swinging arm and 2 its guide ring or eye for the spindle, such arm swinging about an axis coincident with the axis of an integral pivot portion 3 which is of tapering configuration an which is carried in the manner hereafter described within a housing of generally tubular form and consisting of two parts, an upper part 4 and a lower part 5, the latter being formed with a depending shank 6 externally screw-threaded to take into the appropriate part of the spinning machine.

The two parts of the housing are secured together by screws 7 and 8 countersunk in apertures 9 and 10 in the bottom housing and taking into aligned tapped holes in bosses 11 formed for the purpose on the rear wall of the top housing 5 which is in the nature of a cap or cover having a dome-shaped top 12.

The mating edges of the top and bottom housings are shaped at 13 and 14 respectively to provide a front aperture of arcuate form passing the swinging arm 1 and allowing it the requisite range of movement about its vertical axis coincident with the pivot portion 3, the upper housing 4 also being formed with a forwardly projecting flange or canopy 15 over the swinging arm 1.

The dome shaped top 12 of the top housing 4, and the bottom housing 5 are each formed with opposed seats 16 for thimbles 17 and 18 which are facsimiles one of the other and which mount the rubber torsion cups providing the combined bearing and spring. The seats are shouldered at 19 to conform with the thimbles and are each formed with a transverse diametrical rib 20 which engages a corresponding slot in the juxtaposed wall of the thimble to prevent rotation of the latter when the parts are assembled.

In the embodiment illustrated, two part spherical rubber cups 22 have their external spherical surfaces bonded to the thimbles 17 and 18 respectively and the internal surface of each cup bonded to the ball-ended head 23 of a metal pin 24. These pins are a tight push fit in aligned sockets provided for the purpose on the ends of the vertical pivot component 3 of the swinging arm 1.

The inner ends of the pins are shown slotted at 25 to engage transverse pins 26 in the sockets so as to prevent relative rotation.

Upon the parts being assembled and the screws 7 and 8 tightened, a self-contained swinging arm sub-assembly is obtained for immediate fitment to a spinning or like machine which sub-assembly combines both bearing and spring. Lubrication is unnecessary and wear and resultant noise is substantially eliminated.

The rubber units are spaced apart sufficiently to provide relative stability to the arm in planes passing through the axis and the outer socket mounting the assembly may be partially rotated and locked in order to adjust the neutral position and initial loading on contact with the belt.

Further, means may be associated with either thimble mounting for pre-compressing the rubber cups, such as an adjusting screw 30 (Fig. 2) within the shank 6 made hollow for the purpose, while the thimbles may have polygonal heads as at 31.

What we claim is:

1. A swinging arm and spring mounting therefor comprising in combination a pivot portion, an arm projecting transversely from said pivot portion, a support for said pivot portion, and a rubber body at each end of the pivot portion held against rotation by said support and providing a bearing which permits swinging movement of the arm from a neutral position to a position under stress and deformation of the rubber and tends to return the arm to such neutral position.

2. A swinging arm and spring mounting therefor comprising in combination a pivot portion having an axis coincident with the swinging axis of the arm, an arm projecting transversely from said pivot portion, a support for said pivot portion, and a rubber resilient cup at each end of the pivot portion held against rotation by said support and providing a bearing which permits swinging movement of the arm from a neutral position to a position under stress and deformation of the rubber and tends to return the arm to such neutral position.

3. A swinging arm mounting according to claim 2 having a support which includes a housing enclosing and mounting the rubber cups in opposed axial alignment.

4. A swinging arm mounting according to claim 3 including a metal thimble bonded to the external surface of each rubber cup and seats in the housing for said thimbles with means preventing relative rotation between the thimbles and the housing.

5. A pivotal spring mounting comprising in combination a pivot having axially aligned sockets in each end, a housing for said pivot having similarly aligned seats, a pin located in each socket, a cup-shaped body of rubber bonded on each pin, and a thimble bonded to the outer surface of each rubber body and resting in the respective seat in said housing.

6. A pivotal spring mounting according to claim 5 wherein the housing is in two parts bolted together and has an arcuate aperture, an arm on said pivot projecting through said aperture, and a screw threaded mounting shank on one of said housing parts.

7. A swinging arm and spring mounting therefor comprising in combination a metal pivot portion, an arm projecting transversely from said pivot portion, a support for said pivot portion, and a rubber body associated with said pivot portion held against rotation by said support, said rubber body providing a bearing which permits swinging movement of the arm from a neutral position to positions at each side thereof under stress and deformation of the rubber which tends to return the arm to such neutral position, the rubber body being between the pivot portion and the support.

8. A swinging arm and spring mounting therefor comprising in combination a pivot portion, an arm projecting transversely from said pivot portion, a support for said pivot portion, and rubber bodies spaced along the axis of the pivot portion and concentric therewith, said rubber bodies being held against rotation by said support and providing a bearing which permits swinging movement of the arm from a neutral position to a position under stress and deformation of the rubber and tends to return the arm to such neutral position.

References Cited in the file of this patent

UNITED STATES PATENTS

| Number | Name | Date |
| --- | --- | --- |
| 1,909,100 | Geyer | May 16, 1933 |
| 1,912,780 | Lautz | June 6, 1933 |
| 2,611,662 | Hadley | Sept. 23, 1952 |

FOREIGN PATENTS

| Number | Country | Date |
| --- | --- | --- |
| 686,176 | Great Britain | Jan. 21, 1953 |